United States Patent [19]

Brennan

[11] 4,096,061
[45] Jun. 20, 1978

[54] RECOVERY AND REUSE OF PAINT SOLIDS FROM WASTE WATER

[75] Inventor: Thomas P. Brennan, Chagrin Falls, Ohio

[73] Assignee: Drew Chemical Corporation, Boonton, N.J.

[21] Appl. No.: 757,022

[22] Filed: Jan. 5, 1977

[51] Int. Cl.² .................................................. C02B 1/20
[52] U.S. Cl. .................................. 210/45; 106/287.3; 210/54; 210/59; 427/345
[58] Field of Search ................... 106/287 PR; 134/10; 210/42 R, 43, 45, 47, 51–54, 59, 60; 427/345; 55/85

[56] References Cited

U.S. PATENT DOCUMENTS

| 2,315,125 | 3/1943 | Mechler | 106/287 PR |
| 2,348,625 | 5/1944 | Hoffman | 106/287 PR |
| 2,968,638 | 1/1961 | Mechler | 106/287 PR |
| 2,978,344 | 4/1961 | Parker et al. | 210/56 |
| 3,753,901 | 8/1973 | Taubman et al. | 210/54 C |
| 3,861,887 | 1/1975 | Forney | 55/85 |
| 3,990,869 | 11/1976 | Forney | 55/85 |

Primary Examiner—Charles N. Hart
Assistant Examiner—Peter A. Hruskoci
Attorney, Agent, or Firm—Marn & Jangarathis

[57] ABSTRACT

A latex base paint waste water containing dispersed paint solids is clarified by flocculating the paint solids with a cationic flocculant. The separated paint sludge is brought to an alkaline pH and treated with an anionic dispersing agent whereby the sludge can be used in the formulation of a latex base paint.

7 Claims, No Drawings

RECOVERY AND REUSE OF PAINT SOLIDS FROM WASTE WATER

The present invention relates to paint production, and more particularly, to a new and improved process for reusing paint solids present in a latex base paint waste water.

In the production of latex base paints, there are obtained waste water streams which contain dispersed paint solids; e.g., by the washing of paint tanks or spills during the production process. In general, such waste water is clarified to produce a clear supernatant and waste paint solids, with the clear supernatant being reused in the process or discarded. The remaining paint solids present a disposal problem, and in addition, represent the loss of valuable starting materials.

The principal object of the present invention is to provide for recovery and reuse of paint solids present in waste water streams.

In accordance with the present invention, a latex base paint waste water stream, containing paint solids, is clarified by flocculating the paint solids with a cationic flocculant. The recovered paint solid sludge is brought to an alkaline pH and mixed with an anionic dispersing agent. The thus treated paint sludge is dispersed in a suitable paint latex base for the production of a latex base paint.

The paint solids present in the waste water are flocculated to effect separation thereof from a clear cupernatant, and such flocculation is effected with a cationic flocculant of a type known in the art. The cationic flocculant is generally a polymer, and in particular, a polyamine or a polyvinylimidazoline. The cationic flocculant is added in an amount effective to flocculate the paint solids in the waste water to provide for effective separation of the solids from a clear supernatant. In general, the cationic flocculant is added to the waste water in an amount of from 0.1% to about 1.0% by weight; however, the present invention is not limited to such illustrative amounts. The flocculation is effected at a neutral pH; i.e., 6.5 to 7.5.

After separation of the clarified supernatant from a paint solid sludge, the sludge is brought to an alkaline pH, generally a pH of at least 8.5, with the pH generally being from 8.5 to 12. The paint solids sludge may be brought to an alkaline pH by the addition of a suitable base, such as ammonia or sodium hydroxide. the choice of a suitable base is deemed to be within the scope of those skilled in the art from the teachings herein.

An anionic dispersant is then added to the paint solid sludge. The anionic dispersant is added in an amount sufficient to neutralize the effect of the previously added cationic flocculant. In general, the anionic dispersant is added to the paint sludge in an amount of from 0.1% to 2.0%, by weight; however, the present invention is not limited to such amounts. A convenient means of determining the correct amount of anionic dispersant to be added is by viscosity measurement with the correct amount of anionic dispersant being an amount which produces the lowest viscosity. The anionic dispersing agent may be any one of a wide variety of anionic dispersing agents, and as representative examples thereof, there may be mentioned: polymaleic anhydride, copolymers of maleic anhydride with an olefin, polyacrylic acid, alkyl naphthalene sulfonates, and the like.

It is to be understood that although the pH is preferably adjusted to an alkaline pH prior to adding the anionic dispersing agent, the anionic dispersing agent may be added to the sludge prior to the pH adjustment.

The paint solid sludge, containing the anionic dispersant, can then be mixed with a latex paint base, e.g., a polyvinylacetate or acrylic latex, of a type known in the art to provide a latex paint. In addition, other additives, as known in the art, can be included in the paint formulation.

The invention will be further described with respect to the following example; however, the scope of the invention is not to be limited thereby.

EXAMPLE

An aqueous paint wash-up waste (7 – 15% solids) is brought to a neutral pH by the use of a saturated solution of aluminum sulfate. A polyamine flocculant (AMERFLOC 440) is added in an amount of 0.16% followed by mixing at low stirring speeds. Flocculated particles are allowed to settle and a clear supernatant is separated from the flocculated sludge particles. The flocculated sludge particles are then filtered to further reduce the water content and ammonia added to the sludge to raise the pH thereof to 9.5. A polymaleic anhydride anionic dispersant is added to the sludge in an amount of 1% to neutralize the cationic flocculant.

The paint sludge is then employed in the formulation of a latex paint by adding a polyvinylacetate paint latex base (UCAR 365) to the sludge in an amount of about ⅓. Further additives conventionally used in the formulation of paints may also be added, as required.

Thus, by proceeding in accordance with the present invention, components of a latex base paint which are present in waste water streams are recovered in a form suitable for reuse in a latex base paint formulation. As a result, the waste disposal problem is eliminated and valuable components are recovered, which reduces overall costs.

Numerous modifications and variations of the present invention are possible in light of the above teachings and, therefore, within the scope of the appended claims, the invention may be practiced otherwise than as particularly described.

What is claimed is:

1. In the clarification of a latex base paint waste water, containing dispersed paint solids by flocculating the paint solids with a cationic flocculant to separate a clarified supernatant from a paint solid sludge, an improved process for recovering and reusing paint solids, comprising:
   adding an anionic dispersant to said paint solid sludge and maintaining said paint solid sludge at an alkaline pH, said anionic dispersant being added in an amount to neutralize the effect of said cationic flocculant; and dispersing said paint solid sludge in an effective amount of latex paint base for the production of a latex base paint.

2. The process of claim 1 wherein the anionic dispersant is added in an amount of from 0.1% to 2.0%, by weight.

3. The process of claim 2 wherein the alkaline pH is at least 8.5.

4. The process of claim 3 wherein said anionic dispersant is at least one member selected from the group consisting of polymaleic anhydride, copolymers of maleic anhydride with an olefin, polyacrylic acid and alkyl naphthalene sulfonates.

5. The process of claim 4 wherein the cationic flocculant is employed in an amount of from 0.1% to 1.0%, by weight.

6. The process of claim 5 wherein said cationic flocculant is at least one member selected from the group consisting of polyamines and polyvinylimidazoline.

7. The process of claim 6 wherein the flocculating is effected at a pH of from 6.5 to 7.5.

* * * * *